Patented May 7, 1929.

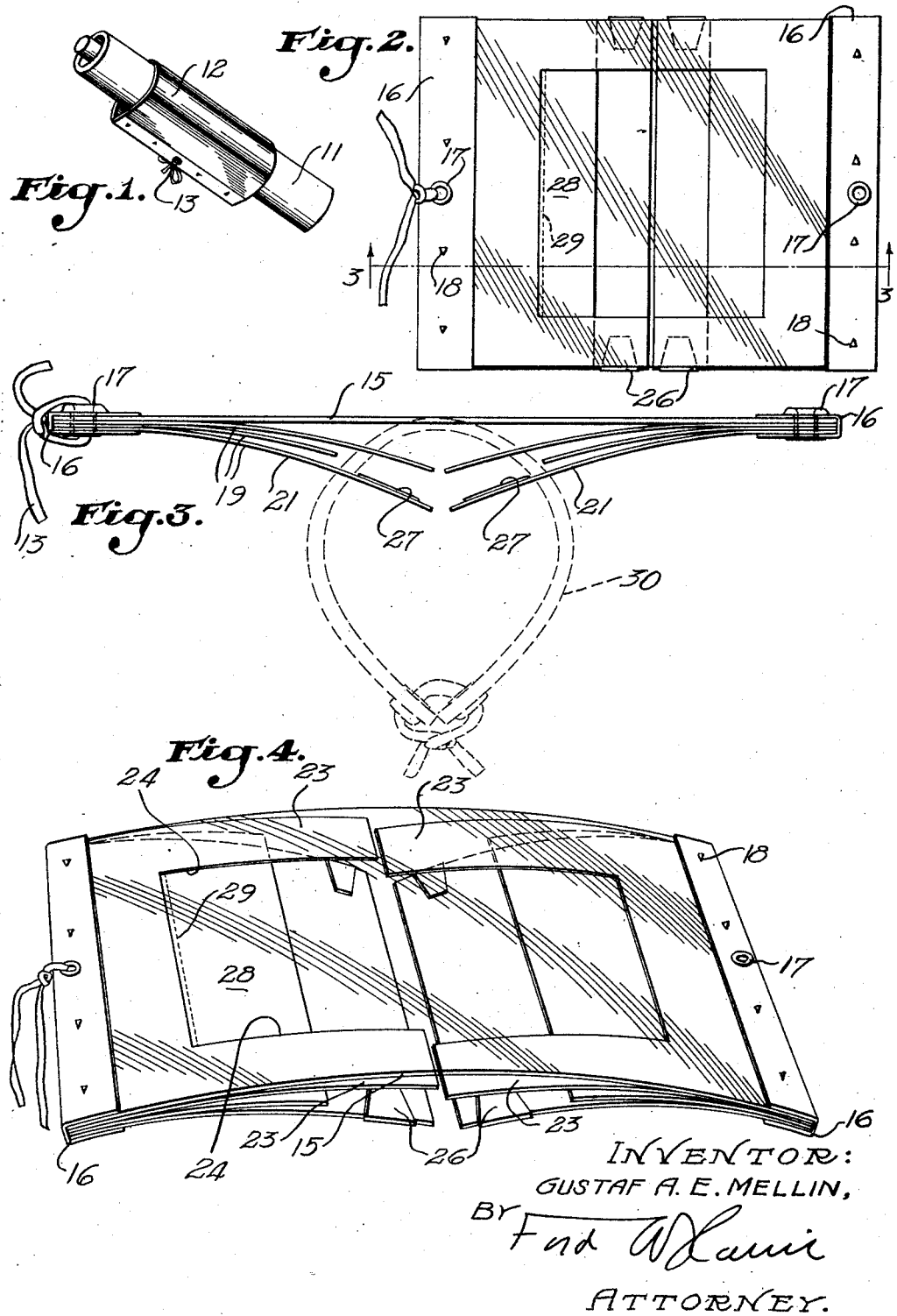

1,712,088

UNITED STATES PATENT OFFICE.

GUSTAF A. E. MELLIN, OF LOS ANGELES, CALIFORNIA.

CERTIFICATE HOLDER.

Application filed November 5, 1927, Serial No. 231,304. Renewed October 24, 1928.

My invention relates to a certificate holder which is adapted to receive an automobile certificate and which is adapted to be secured around the steering post of an automobile.

One of the objects of this invention is to provide a certificate holder which is suitable for the various requirements in different States and which will receive and properly display various sizes of certificates.

Some States require the registration certificate to be fully displayed at all times while other States are not so strict and only require that a certificate be in the car or on the driver's person. It is the law in some States, requiring the certificate to be fully displayed at all times, that the name and address of the legal owner be printed thereon. This is objectionable, since it publishes the fact that the driver of the car has not fully paid for it. For this reason, laws of certain States do not require that this portion of the certificate be displayed.

It is an object of my invention to provide a certificate holder which is designed so that any portion or all of the certificate may be displayed according to the desires of the automobile driver.

The ordinary form of certificate holder consists of a pair of flat members, one of which has a transparent front which is open at one edge. The certificate is slipped between the two parts from this open edge. This is somewhat inconvenient since the corners of the certificate tend to catch, and this resists the moving of the certificate into the holder.

In my invention I overcome this disadvantage by providing a certificate holder in which the back-sheet is made in two parts so that they may be moved away from the transparent front, this allowing the certificate to be placed flatly against the transparent front. After this is done the two parts of the back member may be replaced in position in back of and against the certificate. One advantage of this construction, of course, is that the certificate may be readily placed in the holder, but another and very important advantage is that the certificate holder may be curved around the steering post without buckling. This is due to the fact that the adjacent edges of the split back may overlap if necessary.

To obviate the possibility of the certificate sliding from proper position in the certificate holder I provide centralizing means which may be bent inward over the certificate, thus centralizing it and preventing it from moving from this position.

As a further precaution against the certificate slipping from place I provide the back-sheet of the certificate holder with friction means which engage the certificate so that it will not tend to slide from the holder.

In the preferred form of the invention the certificate holder is provided with a plurality of split back-sheets, the adjacent edges of the pieces of the back-sheet being spaced different distances apart. The back-sheet adjacent to the transparent front has the greatest distance between the edges of its pieces, whereas the back-sheet farthest from the transparent front has substantially no space between its pieces. If all of the certificate is to be shown it is placed directly in back of the transparent front. If only a portion of it is to be shown it may be placed between any adjacent back-sheets as desired. It may be desirable to display a portion of the certificate which is not possible by the arrangement of the back-sheets. To overcome this disadvantage in my invention, one or more of the pieces of the back-sheets may be perforated so that an adjustable portion will be provided. This adjustable portion may be bent back or may be torn off so that the desired portion of the certificate may be made visible.

Other objects and advantages of the invention will be made to appear in the following description.

The invention is best illustrated by reference to the accompanying drawing in which, Fig. 1 is a diagrammatic view illustrating the manner in which the certificate holder of the invention is placed around a steering post.

Fig. 2 is a face view of the certificate holder.

Fig. 3 is a section taken on the line 3—3 of Fig. 2.

Fig. 4 is a perspective view of the invention.

Referring particularly to Fig. 1, the numeral 11 represents a steering post and the numeral 12 represents a certificate holder of my invention secured around the post 11 by means of a suitable tie 13. The certificate holder, as illustrated in Figs. 2 to 4 inclusive, includes a transparent front or shield 15 which may be made of celluloid. Secured to the ends of the shield 15 are U-shaped end members 16 which are preferably made of metal so that the shield 15 and the other parts secured thereto will be rigidly supported. The end members 16 may be secured to the shield 15 by eye rivets 17 and by outstruck portions 18.

The invention provides a series of back-sheets 19, there being any number of back-sheets provided, but in the drawing three are deemed sufficient to illustrate the invention. The back-sheets are each made in two pieces 21, the outer edges of which are secured to the shield 15 by the end member 16. The back-sheet 19 adjacent to the shield 15 is provided with side portions 23 which extend from opposite sides of a rectangular opening 24 provided by this back-sheet 19. The two pieces 21 of the next back-sheet 19 are a considerable distance apart, as shown best in Figs. 3 and 4, whereas the pieces 21 of the last back-sheet may engage each other when the members are against the shield 15.

The last back-sheet 19 is provided with centralizing means in the form of centralizing tabs 26 which are secured to or formed integral with the inner parts of each of the pieces 21 of this last back-sheet. The tabs 26 are designed for being extended inward over a certificate in order to centralize the certificate.

The last back-sheet is likewise provided with friction means in the form of friction pads 27 which are positioned to engage the back of a certificate placed in the holder and assist in preventing it from moving in centralized position.

As shown best in Figs. 2 and 4, one or both of the pieces 21 of the intermediate back-sheet 19 have an adjustable portion 28 which is provided by perforating a piece 21, as indicated at 29. This adjustable portion 28 may be bent back or torn off when it is desired to display one end of the certificate.

The certificate which is to be carried in a certificate holder may be placed in front of or between any of the back-sheets 19. If the certificate is placed in front of the back-sheets it is entirely visible through the transparent shield 15. If it is placed between the first back-sheet and the second back-sheet, only the central part and not the edges will be shown. If the certificate is placed between the second and last back-sheet, but a small portion of the central part of the certificate will be displayed. The certificate is readily placed in the holder by placing it in a flat position upon a table with the transparent shield down. The back-sheets below which the certificate is to be placed are then moved upward so that the certificate may be placed in a flat position against the upper exposed surface. After this is done, the back-sheet or back-sheets which have been bent outward are returned to their normal position, and thereafter the centralizing tabs 26 are extended around the certificate to assist in holding it in proper position. When the back sheets are moved into normal position the friction pads 27 will engage the certificate and will assist the centralizing tabs in maintaining the certificate in proper position. The certificate holder is now ready to be installed on a steering post, as shown in Fig. 1. The two ends of the holder are moved into adjacent positions, as shown in Fig. 1, and the certificate holder will then assume the position as shown in Fig. 1 and by dotted lines 30 in Fig. 3. The tie 13 is then extended through the openings of the eye rivets 17 and the ends of the certificate holder are tied together as illustrated.

If it is desired to show either end of the certificate, this may be done by bending back or tearing off the adjustable portion 28.

The features of the invention may be briefly enumerated as follows:

The certificate is held in proper position by the tabs 26 and the friction pads 27. Any portion of the certificate may be displayed by placing it either in front or between the various back-sheets 19. Either end may be displayed by removing the adjustable portion 28. The certificate may be readily placed in view of the fact that the back-sheets are split. Another feature of the invention is that no strain will be placed upon the celluloid shield when it is installed on the steering post, due to the fact, first, that the back-sheets are formed so that they may overlap and thus prevent buckling, and second, because the ends of the certificate are not pulled inward so as to form a cylinder. A further feature of the invention is that the certificate holder will not otherwise buckle due to the end members 16 which are made of metal.

I claim as my invention:

1. A certificate holder comprising: a transparent shield; end members secured to the ends of said shield; a back-sheet in back of said shield, and secured thereto by said end members, said back-sheet being in two parts; and centralizing tabs attached to said back-sheet, capable of being bent inward to hold in place a certificate placed between said shield and said back-sheet.

2. A certificate holder comprising: a transparent shield; end members secured to the ends of said shield; and a plurality of back-sheets in back of said shield, and secured thereto by said end members, said back-sheets being in two parts.

3. A certificate holder comprising: a transparent shield; end members secured to the ends of said shield; a plurality of back-sheets in back of said shield, and secured thereto by said end members, said back-sheets being in two parts; and centralizing tabs attached to one of said back-sheets, capable of being bent inward to hold in place a certificate placed between said shield and said back-sheets.

4. A certificate holder comprising; a transparent shield; end members secured to the ends of said shield; and a plurality of back-sheets in back of said shield, and secured thereto by said end members, said back-sheets being in two parts, the pieces comprising the different back-sheets being arranged so that the distances between their adjacent edges vary, the back-sheet next to said shield having the greatest distance between its pieces.

5. A certificate holder comprising: a transparent shield; end members secured to the ends of said shield; a plurality of back-sheets in back of said shield, and secured thereto by said end members, said back-sheets being in two parts, the pieces comprising the different back-sheets being arranged so that the distances between their adjacent edges vary, the back-sheet next to said shield having the greatest distance between its pieces; and centralizing tabs attached to one of said back-sheets, capable of being bent inward to hold in place a certificate placed between said shield and said back-sheets.

6. A certificate holder comprising: a transparent shield; end members secured to the ends of said shield; a back-sheet in back of said shield, and secured thereto by said end members, said back-sheet being in two parts; and a friction member carried by said back-sheet.

7. A certificate holder comprising: a transparent shield; end members secured to the ends of said shield; a back-sheet in back of said shield, and secured thereto by said end members, said back-sheet being in two parts; centralizing tabs attached to said back-sheet, capable of being bent inward to hold in place a certificate placed between said shield and said back-sheet; and a friction member carried by said back-sheet.

8. A certificate holder comprising: a transparent shield; end members secured to the ends of said shield; and a back-sheet in back of said shield, and secured thereto by said end members, said back-sheet being in two parts, said back-sheet having an adjustable portion.

9. A certificate holder comprising: a transparent shield; end members secured to the ends of said shield; a back-sheet in back of said shield; and a plurality of back-sheets in back of said first mentioned back-sheet and secured to said shield and said back-sheet by said end members, said second mentioned back-sheets being in two parts.

10. A certificate holder comprising: a transparent shield; end members associated with said shield; a back-sheet in back of said shield; and a back-sheet in back of said first mentioned back-sheet, said last mentioned back-sheet being in two parts, and said back-sheets being held to said shield by said end members.

11. A certificate holder comprising: a transparent shield; a back-sheet in back of said shield; a plurality of sheets in back of said back-sheet and being in two parts; and end members carried by said shield for securing said sheets thereto, said end members being formed with reinforcing means.

12. A certificate holder comprising: a transparent shield; metallic end members secured to the ends of said shield; a back-sheet in back of said shield; and a sheet in back of said back-sheet formed in two parts, said sheets being secured to said shield by said end members.

13. A certificate holder comprising: a transparent shield; a back-sheet in back of said shield; a sheet in back of said back-sheet, said sheet being in two parts; end members secured to the ends of said shield for holding said sheets thereto; and means on said ends for reinforcing said shield and said sheets.

14. A certificate holder comprising: a transparent shield; a back-sheet in back of said shield having a central opening; a sheet in back of said back-sheet formed in two parts, providing a central opening; metallic members secured to the ends of said shield for holding said sheets thereto; and means on said ends adapted to penetrate said shield and sheets for reinforcing same.

15. A certificate holder comprising: a flexible transparent shield; end members secured to the ends of said shield; and a back-sheet in back of said shield and secured thereto by said end members, said back-sheet being composed of two flexible parts.

16. A certificate holder comprising: a flexible transparent shield; end members secured to opposite edges of said shield; and a back-sheet in back of said transparent shield; said back-sheet being composed of two flexible parts, one part being secured to said transparent shield by one of said end members and the other part of said back-sheet being secured to said transparent shield by the other of said end members.

17. A certificate holder comprising: a flexible transparent shield; end members secured to opposite edges of said shield; and a back-sheet in back of said transparent shield, said back-sheet being composed of two flexible parts, said parts being oppositely disposed and extending in the same plane, one part being secured to said transparent shield by one of said end members and the other part of said back-sheet being secured to said transparent shield by the other of said end members.

18. A certificate holder comprising: a flexible transparent shield; end members secured to said shield; and a back-sheet in back of said shield secured to said shield by said end members, said back-sheet having oppositely disposed flexible members extending in the same plane.

19. A certificate holder comprising: a flexible transparent shield; end members secured to the ends of said shield; and a plurality of flexible back-sheets in back of said shield, the last back-sheet being composed of a plurality of flexible segments, said segments being secured to said shield by said end members.

20. In a certificate holder the combination of: a flexible transparent shield; end members secured to the ends of said shield; a back-sheet formed of two flexible parts in back of said shield, said parts being secured to said shield by said end members; and means between said shield and said back-sheet adapted to show various parts of a certificate.

In testimony whereof, I have hereunto set my hand at Los Angeles, California, this 29th day of October, 1927.

GUSTAF A. E. MELLIN.